United States Patent [19]

Hwang et al.

[11] Patent Number: 5,301,957
[45] Date of Patent: Apr. 12, 1994

[54] EXPANDING CIRCUMFERENTIAL SEAL WITH UPPER-COOLED RUNNER

[75] Inventors: Ming-Fong Hwang, Chester; Adam N. Pope, Cincinnati, both of Ohio

[73] Assignee: General Electric Company, Cincinnati, Ohio

[21] Appl. No.: 876,733

[22] Filed: Apr. 27, 1992

[51] Int. Cl.$^5$ .............................. F16J 15/32
[52] U.S. Cl. ........................ 277/58; 277/53; 277/142; 277/149; 277/192
[58] Field of Search ............. 277/3, 120, 138, 53, 277/58, 142, 148, 149, 192, 154, 35, 37, 44, 47, 59; 415/110, 111, 230

[56] References Cited

U.S. PATENT DOCUMENTS

| | | | |
|---|---|---|---|
| 2,867,458 | 1/1959 | Kroekel | 277/149 |
| 3,162,451 | 12/1964 | Brose | 277/53 |
| 3,561,770 | 2/1971 | Corsi | 277/37 |
| 3,608,910 | 9/1971 | Tyler | 277/15 |
| 4,082,296 | 4/1978 | Stein | 277/3 |
| 4,311,346 | 1/1982 | Danner | 277/58 |
| 4,465,427 | 8/1984 | Libertini et al. | 415/1 |
| 4,531,746 | 7/1985 | Amdall et al. | 277/53 |
| 4,645,415 | 2/1987 | Hovan et al. | 415/115 |
| 4,667,967 | 5/1987 | Deuring | 277/53 |
| 4,969,652 | 11/1990 | Munson | 277/22 |
| 5,169,159 | 12/1992 | Pope et al. | 277/53 |
| 5,183,269 | 2/1993 | Black et al. | 277/35 |

Primary Examiner—William A. Cuchlinski, Jr.
Assistant Examiner—D. DePumpo
Attorney, Agent, or Firm—Jerome C. Squillaro; John R. Rafter

[57] ABSTRACT

A circumferential seal arrangement has one or more expanding carbon rings and a rotating runner concentric to and radially outside of the carbon rings. Cooling oil is injected directly onto the outer circumferential surface of the runner and also in the direction of the bearings. The runner shields the seal interface from the cooling oil. To facilitate scavenging of oil from the cavity between the bearings and seal assembly and thereby further reduce the amount of oil reaching the seal interface, a disk pump is mounted on the main shaft between the runner and the bearing. As the main shaft rotates,, the disk pump slings oil adhering on its surfaces into an annular oil purge channel. The sealing arrangement also incorporates a discourager which forms a barrier to direct oil leaking through the seal interface to an overboard drain.

7 Claims, 5 Drawing Sheets 5,301,957

EXPANDING CIRCUMFERENTIAL SEAL WITH UPPER-COOLED RUNNER

FIELD OF THE INVENTION

This invention relates generally to the use of oil seals in a gas turbine engine. Specifically, the invention relates to an improved arrangement for oil cooling a circumferential seal in a gas turbine engine. Although the invention was developed for use in an axial flow gas turbine engine, it has application outside this field.

BACKGROUND OF THE INVENTION

In a gas turbine engine, the turbine is of multi-stage construction. Each stage comprises a rotating multi-bladed rotor and a nonrotating multi-vane stator. The blades of each rotor are circumferentially distributed on a disk connected to the main shaft. The shaft is rotatably supported by bearings. The turbine drives the compressor by way of the main shaft in response to aerodynamic interaction of the rotor blades and stator vanes with the high-energy gases expelled from the combustor.

The shaft-supporting bearings are disposed in a bearing compartment. During engine operation, friction in the rolling bearings and the rotating runners of associated seals generates heat. To cool the bearings and seals, a system for injecting oil into the bearing compartment is provided.

To prevent the escape of oil from the bearing compartment in main shaft applications, a conventional practice is to install circumferential seals with under-cooled runners, such as that depicted in FIG. 1. The term "circumferential seal" as used herein is intended to encompass a generic type of sealing device which consists primarily of a plurality of arcuate carbon material segments arranged circumferentially in abutting relationship to form a continuous ring which opposes a corresponding circumferential surface of a runner, forming a seal or rubbing interface therebetween.

In accordance with the conventional circumferential sealing arrangement depicted in FIG. 1, two segmented non-rotating carbon rings 2 and 2' are secured to the seal housing structure 4. Carbon rings 2 and 2' are urged into contact with the outer circumferential surface of the runner 6 by respective garter springs 8 and 8'. The runner 6 is connected to the main shaft 10 and rotates therewith.

Each garter spring encircles the outer diameter of the carbon segments of the respective sealing ring and provides a radially inwardly directed force. The carbon segment ends contain overlapping tongue and socket joints (not shown) to restrict leakage at the end gaps.

In accordance with this conventional arrangement, a windback seal 12 is machined into the seal housing structure 4. The windback seal generally consists of an open helical thread through which small quantities of oil may be discouraged from collecting at a sealing interface due to the "windage" generated by the outer circumferential surface of the rotating runner.

Circumferential seals are used to separate ambient areas of high pressure air ($P_a$) from an oil wetted area at lower pressures ($P_s$) and serve two major functions. First, circumferential seals prevent the leakage of oil from the lower pressure ($P_s$) bearing compartment (i.e., oil sump 14). Second, circumferential seals minimize the flow rate of the hot air from the high pressure area to the oil wetted sump 14.

The conventional circumferential seal arrangement shown in FIG. 1 is a tandem air-air and air-oil seal design (two carbon rings) with an air pressurization system 16. Two carbon rings are used because the oil sump pressure is higher than the ambient pressure ($P_s > P_a$) in this application. Pressurized air having a pressure higher than $P_s$ is supplied to the space between the carbon rings 2, 2' to ensure a positive air-to-oil sealing, that is, the pressure differential is such that air tends to flow into, not out of, the oil sump across any gap in the carbon seal.

For sealing applications where the internal engine ambient pressure is higher than the oil sump pressure ($P_a > P_s$), the one carbon ring seal design shown in FIG. 2 can be used.

In these respective embodiments, the pressure drop between the high and low pressure ambients is taken across the stationary carbon ring 2 or rings 2 and 2'. A rubbing force is generated at the interface 18 of each carbon ring and the rotating runner 6. The frictional forces at the interface 18 generate significant amounts of heat. This heat must be either absorbed by the seal housing 4 and runner 6 or otherwise removed from the seal region.

Without adequate heat extraction, heating of the rubbing interface can become excessive, especially when the sealing pressure drops and rubbing speeds are high. An excessively high temperature at the interface can cause severe damage to the seal. In particular, oil coke can fill up the seal bore reliefs, recess grooves and end gaps of the carbon ring. In addition, excessive wear of the carbon segments and cracking and grooving of the runner coating and surface can occur. It can also result in excessive oil leakage through the seal and correspondingly high oil consumption.

The conventional technique to avoid over-heating in the vicinity of the seal interface is to cool that vicinity with oil. In particular, it is advantageous to inject cooling oil under the runner. When an under-cooled runner is used (see FIG. 1), an oil injector 20 is provided with two outlets 22 and 24. The oil jet 27 exiting the injector via outlet 24 cools the bearing, generally indicated by the numeral 26 in FIG. 1. The oil jet 28 exiting the injector via outlet 22 is directed toward the peripheral edge of the runner. The oil jet 28 is scrolled to the inner circumferential surface 30 of runner 6 to remove the heat conducted from the rubbing interface 18 to the outer circumferential surface of the runner.

The thorniest problem associated with this under-cooled design is the thin film depth and sluggish velocity of the oil on the inner circumferential surface 30 of the runner 6. In most engine lubricating systems, due to factors such as space limitation and windage deflection of the oil jet, the oil jetting under the runner cannot be made to impinge directly under the rubbing interface with high wiping velocity. Therefore, heat absorption by the sluggishly moving oil film must occur by very slow molecular diffusion. The resulting heat transfer coefficient is very low.

In addition, it is likely that the oil jet directed toward the runner in accordance with the conventional sealing arrangement will be partially deflected by the runner/shaft windage. The windage stream also causes oil jet fanning. The deflected and/or fanning oil jet can easily miss the runner annulus and scroll into the windback seal, resulting in excess oil ingestion at the seal. Oil shearing between the carbon bore and the outer circumferential surface of the runner will generate significantly more heat than that generated by dry frictional rubbing. Therefore, the temperature of the rubbing interface 18 will become much higher.

SUMMARY OF THE INVENTION

One object of the present invention is to provide a solution to the inefficient and insufficient oil cooling which is inherent in conventional circumferential seals having under-cooled runners.

Another object of the invention is to provide a circumferential seal arrangement wherein dissipation of rubbing heat generated at the interface between a stationary sealing ring and a rotating runner is improved.

Also it is an object of the invention to provide a circumferential seal arrangement wherein an oil jet can be targeted with high wiping velocity onto the runner at an axial position corresponding to the rubbing interface.

Another object of the invention is to reduce the amount of heat generated at the rubbing interface of a circumferential seal.

A further object of the invention to reduce the potential for ingestion of oil into the interface between a stationary sealing ring and a rotating runner of a circumferential seal.

In particular, it is an object of the invention to prevent oil coking in the interface and end gaps of a segmented circumferential seal.

Yet another object of the invention is to provide a circumferential seal arrangement wherein the carbon segments of the sealing ring are shielded from the oil which cools the runner and bearing.

It is also an object of the invention to provide a simple and efficient mechanism for scavenging oil from the cavity between the seal assembly and the bearings supporting a turbine rotor shaft.

Another object of the invention is to provide a circumferential seal arrangement having a primary seal and a backup seal to provide additional protection against oil leakage and to prevent catastrophic oil leakage if the primary seal fails.

Yet another object of the invention is to provide a circumferential seal arrangement that does not require the incorporation of a windback seal. Correspondingly, it is a further object to design a seal housing structure which is simpler, lighter and more compact than the prior art structures.

These and other objects are realized in accordance with the invention by providing a circumferential seal arrangement comprising one or more expanding carbon rings and a rotating runner concentric to and radially outside of the carbon rings. Cooling oil is injected directly onto the outer circumferential surface of the runner and also in the direction of the bearings. The runner shields the seal interface from the cooling oil.

To facilitate the scavenging of oil from the cavity between the bearings and seal assembly and thereby reduce the amount of oil reaching the seal interface, a disk pump is mounted on the main shaft between the runner and the bearing. As the main shaft rotates, the disk pump slings oil adhering on its surfaces into an annular oil purge channel.

In addition, the sealing arrangement in accordance with the invention incorporates a discourager which forms a barrier to direct oil leaking through the seal interface to an overboard drain.

BRIEF DESCRIPTION OF THE DRAWINGS

These and other advantages of the invention will be better understood when the detailed description of the preferred embodiments of the invention is read in conjunction with the drawings, wherein.

DETAILED DESCRIPTION OF THE PREFERRED EMBODIMENTS

Figure 3:
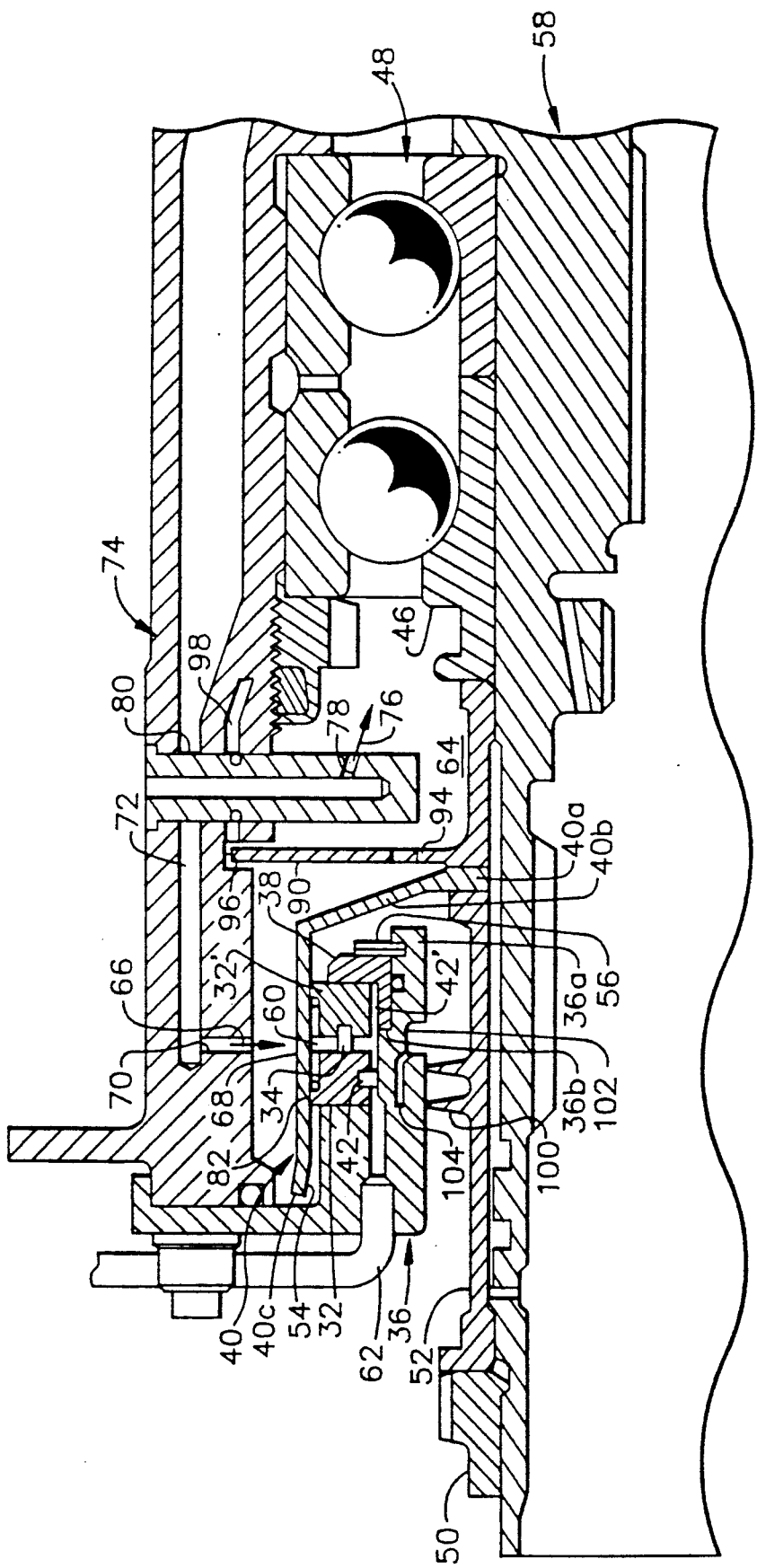
FIGS. 3 and 4 are cross-sectional views of circumferential seal arrangements with upper-cooled runner in accordance with two preferred embodiments of the present invention, one with tandem expanding carbon seals (FIG. 3) and the other with a single expanding carbon seal (FIG. 4)
Figure 5:
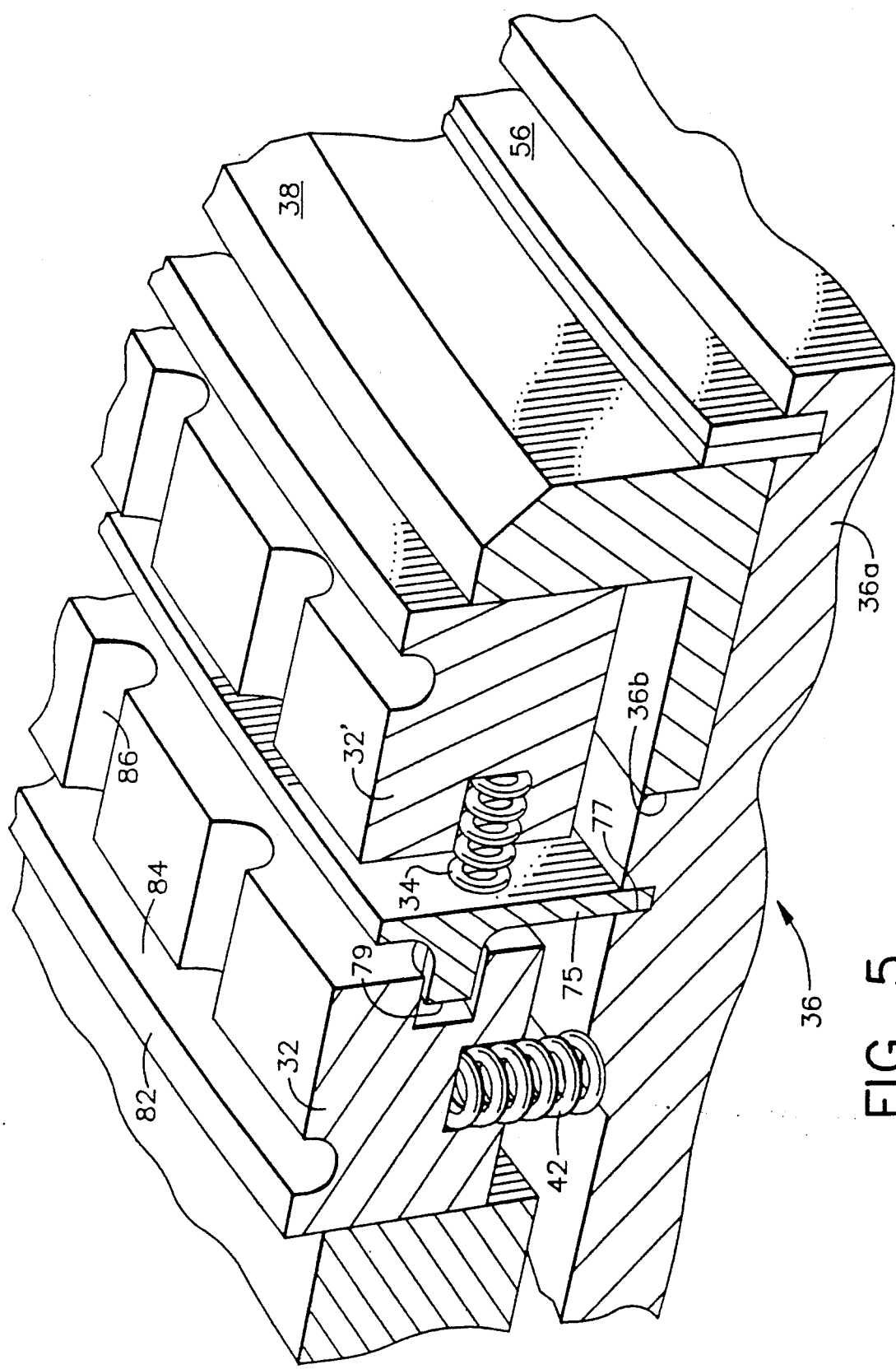
FIG. 5 is a sectional perspective view of a portion of the circumferential seal arrangement depicted in FIG. 3.

A first preferred embodiment of the invention is shown in FIGS. 3 and 5. The sealing arrangement comprises tandem carbon rings 32, 32' having a plurality of spreader springs 34 therebetween. The spreader springs press carbon ring 32 against a radial surface of the seal housing structure 36 and press carbon ring 32' against a radial flange of a ring 38 having an L-shaped cross section through a mid-plate assembly 75 (see FIG. 5). For the sake of convenience, this midplate assembly is not depicted in either FIG. 1 or FIG. 3.

The midplate assembly 75 consists of a plurality of annular segments, each segment having a first plurality of pins 79 circumferentially distributed on one side thereof and a second plurality of pins (not shown in FIG. 5) circumferentially distributed on the other side thereof. The pins of the first plurality are staggered relative to the pins of the second plurality.

The spreader springs 34 also comprise first and second pluralities arranged on respective sides of the midplate assembly, the springs of the first plurality being staggered relative to the pins of the second plurality.

The inner peripheral edge of each segment of the midplate assembly 79 is received in a corresponding recess 77 in the seal housing structure 36, whereby the midplate assembly 79 is locked against rotation. Alternatively, the midplate assembly may be provided with notches that cooperate with antirotation pins to prevent rotation of the assembly.

Because pins 79 are alternately inserted in corresponding recesses in carbon rings 32 and 32', the midplate assembly effectively prevents rotation of the carbon rings, particularly rotation due to the drag forces exerted on the carbon rings at the rubbing interfaces by runner 40.

As best seen in FIG. 5, ring 38 is seated on the outer circumferential surface of an annular section 36a of a seal housing 36, one end of ring 38 abutting a shoulder 36b. Ring 38 is locked in place by means of a locking ring 56 which fits snugly into an annular recess formed in annular section 36a.

Unlike the contracting type of circumferential seals conventionally used in gas turbine engines, the circumferential seals of the present invention are the expanding type. The segments of each carbon ring 32 and 32' are urged radially outward against the seal runner 40 by respective pluralities of compression coil springs 42 and 42′ (hereinafter "expansion springs"). Since the expansion springs 42′ of carbon seal 32′ are staggered relative to the expansion springs of carbon seal 32, expansion spring 42′ has only a bottom portion visible in FIG. 3 and has no portion visible in FIG. 5.

In addition, the segment ends of carbon rings 32 and 32′ contain overlapping tongue and socket joints (not shown) to restrict leakage at the end gaps.

The seal runner 40 is a thin cylindrical structure with one end closed by a conical section 40b which extends inwardly toward the main shaft 58. The conical section 40b is in turn connected to an annular ring 40a which is mounted on the main shaft 58. This is accomplished by clamping the entire runner structure against the inner race 46 of the bearing 48 by a spanner nut 50 through a spacer 52.

The cylindrical inner surface 54 of runner 40 is ground smooth to a finish of about 8 microinches to provide a good sealing surface for the carbon segments. The sealing dam and main sealing surface 82 of each expanding carbon ring 32, 32′ is located at the outer bore of the carbon segments and form respective rubbing interfaces with the inner circumferential surface 54 of runner 40. The open end of runner 40 has a generous lead-in chamfer 40c at its internal diametral edge to prevent damage to the carbon sealing dams 82 during assembly.

In each carbon ring the dam 82 is bounded by an annular air channel 84 (see FIG. 5) formed in the outer bore of the carbon segments. The annular air channel 84 communicates with space 60 between the carbon rings 32, 32′ via a plurality of axial air slots 86 formed in the outer diameter of the carbon segments. Pressurized air having a pressure higher than $P_s$ is supplied via air line 62 to annular channel 84 of carbon seal 32 by way of slots 86 and space 60 to ensure a positive air-to-oil sealing pressure. The sealing surface 82 minimizes the flow rate of hot air from space 60, past the main sealing surface 82 of carbon ring 32 and to the oil wetted sump 64. The positive air-to-oil pressure differential in turn minimizes the amount of oil leaking onto the sealing surfaces of carbon ring 32 and as a consequence, reduces the amount of frictional heat generated due to oil shearing at the rubbing interface.

Figure 1:
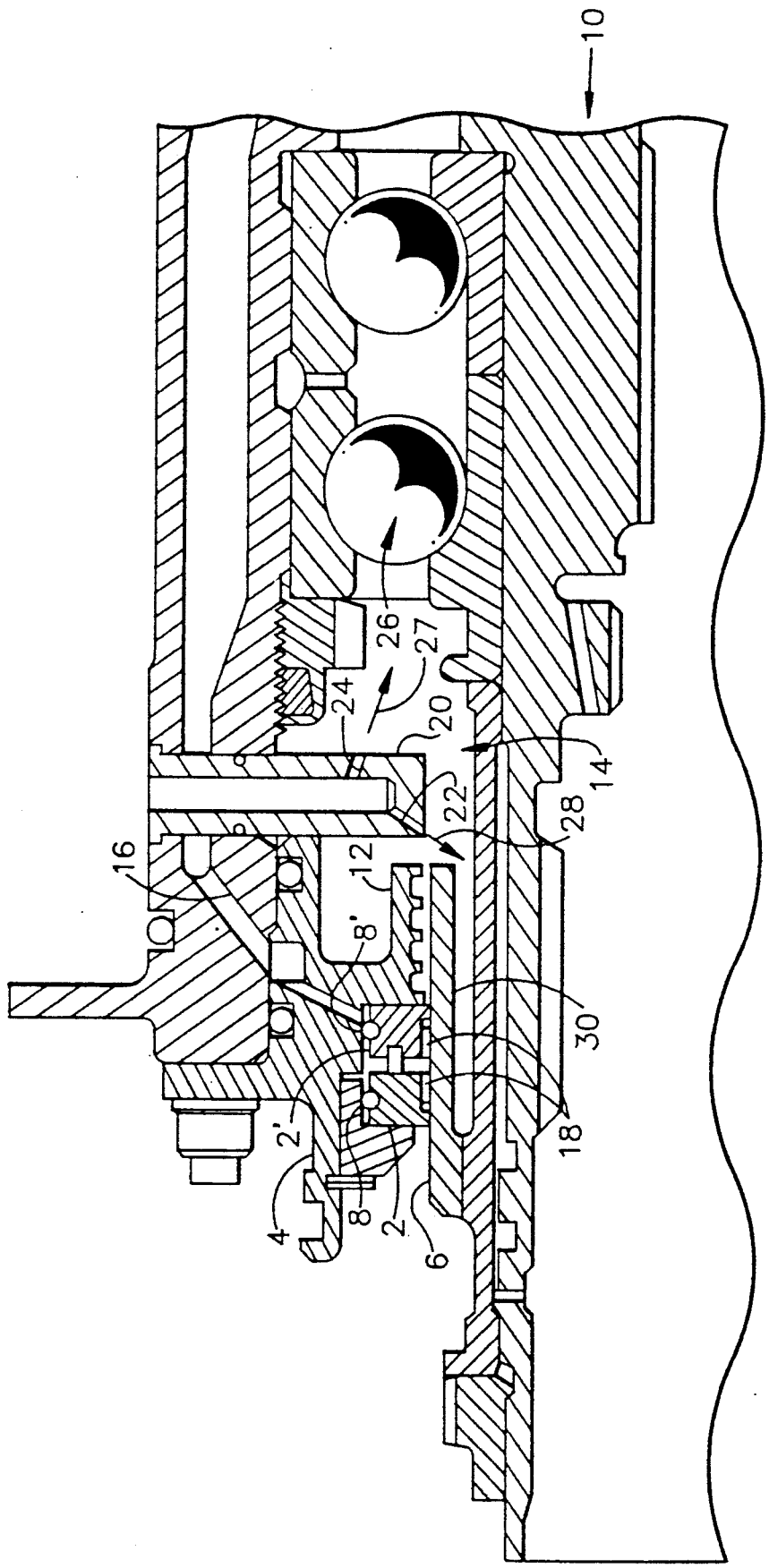
FIGS. 1 and 2 are cross-sectional views of conventional circumferential seal arrangements with under-cooled runners, one with tandem contracting carbon seals (FIG. 1) and the other with a single contracting carbon seal (FIG. 2)
Figure 2:
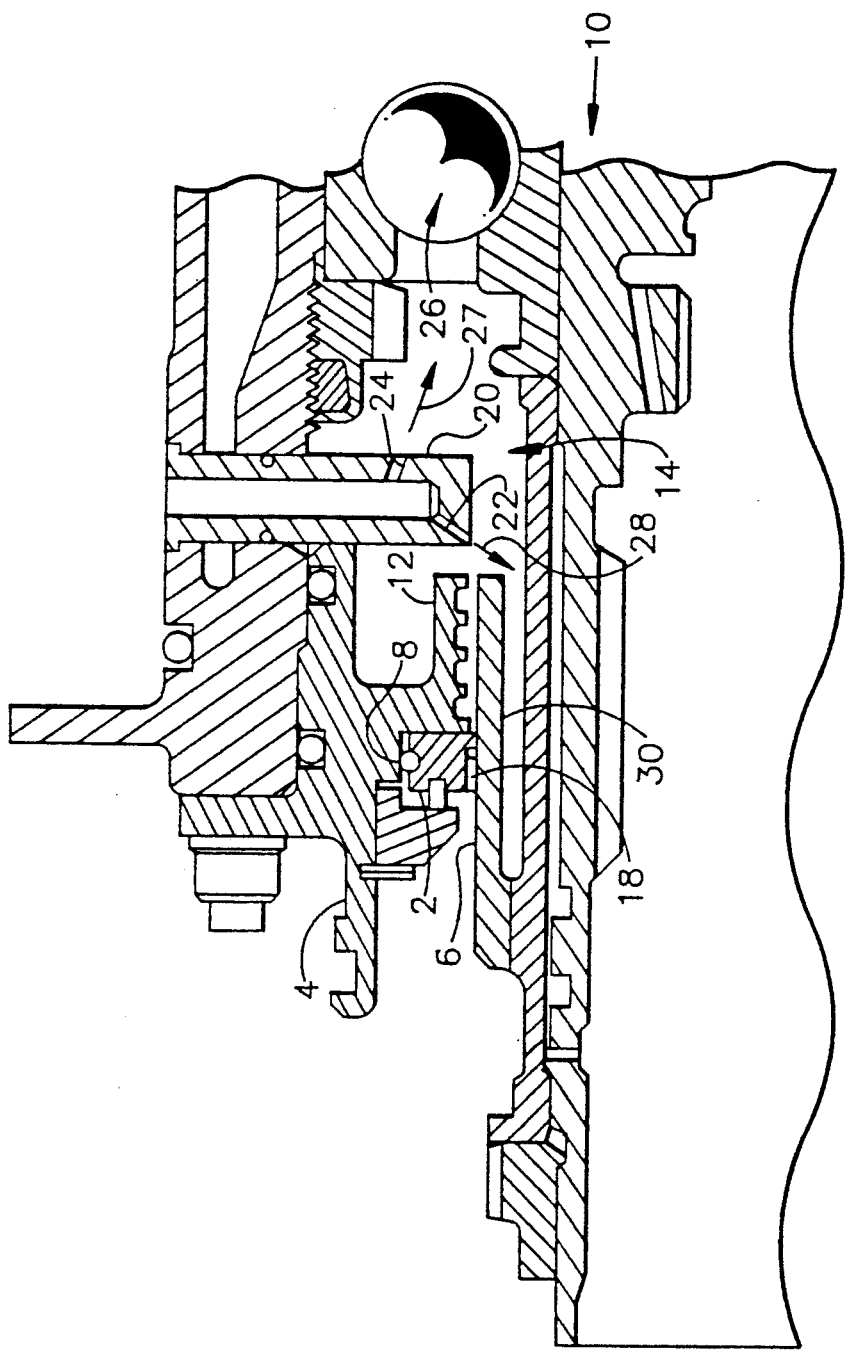

Comparing FIGS. 1 and 3, it can be seen that the invention inverts the hardware configuration of the conventional system by placing the carbon seals inside instead of outside the seal runner. This has the advantage that the runner 40 (FIG. 3) can be cooled by direct impingement of an oil jet 66 on its outer circumferential surface 68. The oil jet 66 dissipates heat conducted by the runner 40 from the rubbing interface of dam 82 with the inner circumferential surface 54 of runner 40. Oil jet 66 is injected via an orifice 70 connected to the oil passage line 72 in the bearing housing 74.

The point of injection of the oil jet 66 is stationary. Therefore the arrangement in accordance with the invention allows the cooling oil jet to directly impinge with high wiping velocity on the outer circumferential surface 68 of the rotating runner 40 at an axial position corresponding to the position of the rubbing interface. An extremely high heat transfer coefficient can be generated to assure efficient heat removal. Also because of the very short heat flow length (equivalent to the thickness of the runner) from the region of heat generation to that of heat extraction, the rubbing interface could almost run near the temperature at which the cooling oil is supplied, which oil supply temperature is well below the oil coking threshold.

Additionally, the carbon segments in the novel inverted arrangement are enclosed by the runner structure, thus minimizing the potential of excessive oil getting into the rubbing interface. This will keep the seal running dryer, thus providing the following major advantages: (1) The potential for a high rate of heat generation due to oil shearing at the rubbing interface is reduced. (2) The supply of the ingredient necessary for coking to occur, i.e., oil, is cutoff. No oil implies no coking.

Consistent with conventional practice, in accordance with the invention a second oil jet 76 for cooling the bearing 48 is injected into the bearing compartment via outlet 78 of oil injector 80.

To further minimize oil getting into the rubbing interface, a disk pump 90 located between the bearing 48 and the runner 40 can be incorporated to facilitate oil scavenging within the sump 64 between the bearing and seal assembly. The disk pump comprises a radial annular disk having a plurality of axial holes 94 circumferentially distributed at a predetermined radius. The holes 94 allow equalization of the amount of oil on opposing sides of the disk pump.

The disk pump 90 centrifugally slings oil which has adhered to its surfaces radially outwardly toward an annular oil purge channel 96 during engine operation. Oil purge channel 96 communicates with an oil passage 98, which carries oil to the other side of the bearing 48. Only a portion of oil passage 98 is visible in the sectional view of FIG. 3.

The circumferential seal arrangement of the invention eliminates the need for the windback seal of the prior art (see element 12 in FIG. 1). Thus the seal housing in accordance with the circumferential seal of the invention is simpler, lighter, and more compact than that of the prior art.

In accordance with a further feature of the invention, a discourager 100 can be machined into the spacer 52 to provide an additional barrier to oil which may leak through the carbon rings 32 and 32′. Discourager 100 effectively serves as a backup seal to provide additional protection against oil leakage and to prevent catastrophic oil leakage if the primary seal fails. The discourager may comprise, for example, a conventional single or multiple-tooth labyrinth seal, the construction of which is well known and will not be described in detail herein. Discourager 100 directs the oil to an overboard drain comprising an annular oil purge channel 102 formed on the inner circumferential surface of annular section 36a of seal housing 36 and which communicates with an oil passage 104. The oil leakage is drained off via oil passage 104, only a portion of which is visible in the sectional view of FIG. 3.

The radial clearance between the discourager teeth and the inner circumferential surface of the seal housing should be sufficient to accommodate the thermal and/or centrifugal growth of main shaft 58 so that rubbing will not occur during any engine operating condition.

Figure 4:
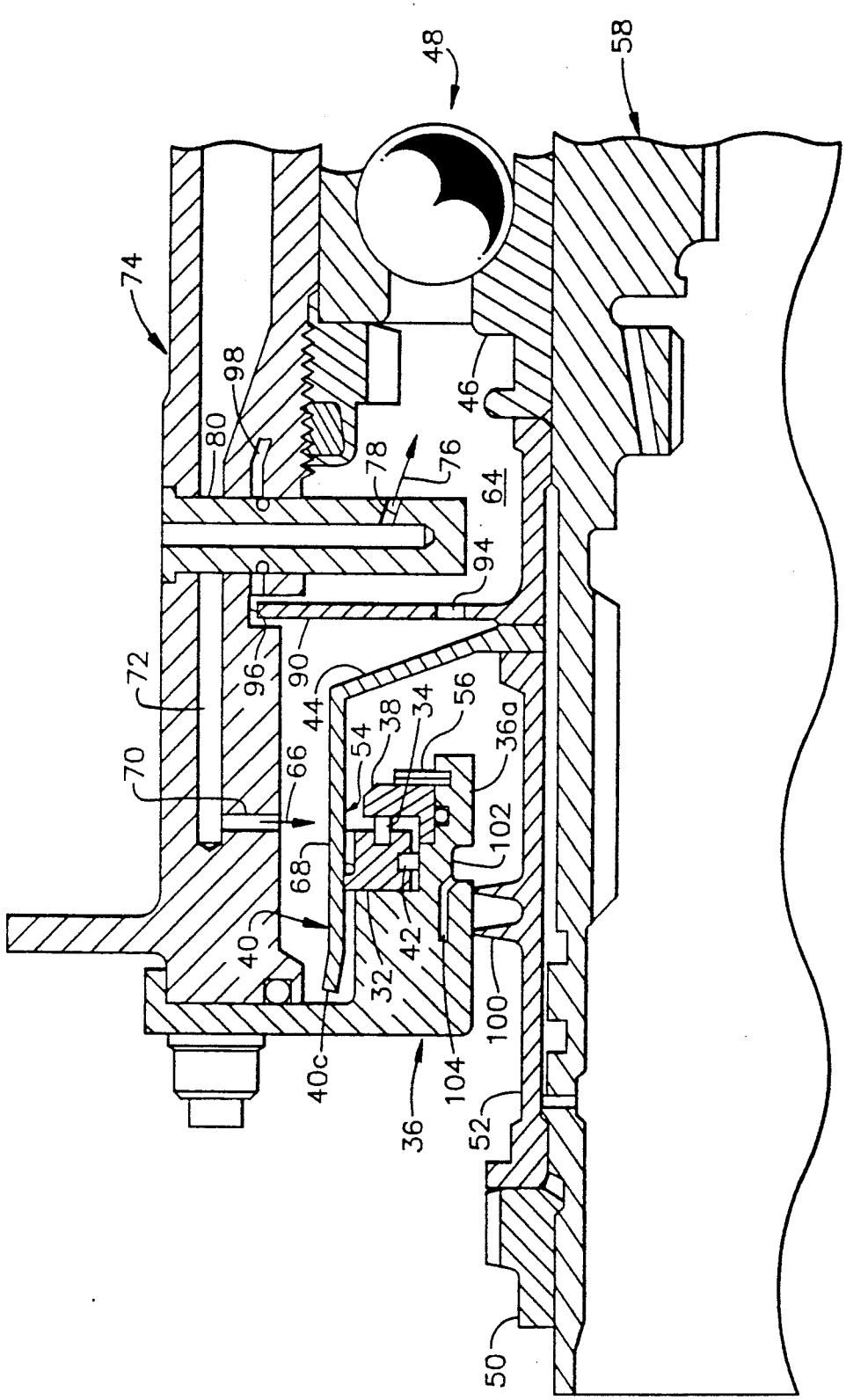

For sealing applications where the internal engine ambient pressure is higher than the oil sump pressure ($P_a > P_s$), the one carbon ring seal design shown in FIG. 4 can be used. The structure and operation of the circumferential seal arrangement shown in FIG. 4 are substantially the same as that for the tandem carbon seal arrangement shown in FIG. 3, except that an air pressurization system is no longer needed to maintain the positive air-to-oil pressure differential across the carbon ring dam.

The preferred embodiments of the invention have been described in detail hereinabove for the purpose of illustration only. It will be apparent to a practitioner of ordinary skill in the art of circumferential seals that various modifications could be made to the above-described structure without departing from the spirit and scope of the invention as defined in the claims set forth hereinafter.

I claim:

1. A seal arrangement for incorporation in a gas turbine engine, comprising:

first circumferential sealing means rotatable with a shaft; and second circumferential sealing means supported by a stationary housing structure and arranged in opposition to said first circumferential sealing means to form rubbing interface means therebetween, wherein said first circumferential sealing means is arranged radially outside of and is concentric with said second circumferential sealing means, said first circumferential sealing means comprises a runner having an inner circumferential surface, said second circumferential sealing means comprises a first carbon ring having an outer circumferential surface, and said rubbing interface means comprises a first rubbing interface formed by said inner circumferential surface of said runner and said outer circumferential surface of said first carbon ring.

2. The seal arrangement as defined in claim 1, wherein said first carbon ring comprises a plurality of carbon segments, further comprising first resilient means for applying a radially outwardly directed force which presses said outer circumferential surface of said first carbon ring against said inner circumferential surface of said runner.

3. The seal arrangement as defined in claim 1, further comprising means for injecting oil onto an outer circumferential surface of said runner at an axial position corresponding to the axial position of said first rubbing interface.

4. The seal arrangement as defined in claim 1, wherein said second circumferential sealing means further comprises a second carbon ring formed by a plurality of carbon segments and having an outer circumferential surface, said second carbon ring being axially displaced relative to said first carbon ring such that a space is formed therebetween, and wherein said rubbing interface means further comprises a second rubbing interface formed by said inner circumferential surface of said runner and said outer circumferential surface of said second carbon ring, further comprising second resilient means for applying a radially outwardly directed force which presses said outer circumferential surface of said second carbon ring against said inner circumferential surface of said runner and third resilient means for applying opposing axially directed forces which hold said first and second carbon ring in spaced apart relationship.

5. The seal arrangement as defined in claim 4, further comprising means for supplying pressurized air to said space formed between said first and second carbon rings.

6. The seal arrangement as defined in claim 1, further comprising back-up seal means for providing a barrier to oil leaking through said rubbing interface means, and means for purging oil which is blocked by said back-up seal means.

7. The seal arrangement as defined in claim 6, wherein said back-up seal means comprising a labyrinth seal having a first circumferential tooth which is rotatable with said shaft and a first circumferential sealing surface formed on said housing structure, a running clearance being defined by a circumferential tip of said first circumferential tooth and by said first circumferential seal surface.

* * * * *